United States Patent [19]
Takei

[11] Patent Number: 5,967,612
[45] Date of Patent: Oct. 19, 1999

[54] HEADREST FOR AUTOMOTIVE SEAT

[75] Inventor: Yoshiyuki Takei, Akishima, Japan

[73] Assignee: Tachi-S Co., Ltd., Tokyo, Japan

[21] Appl. No.: 09/099,316

[22] Filed: Jun. 18, 1998

[51] Int. Cl.$^6$ ........................................................ A47C 1/10
[52] U.S. Cl. ...................................... 297/391; 297/DIG. 1
[58] Field of Search .................................... 297/391, 410, 297/DIG. 1, 452.18, 452.2

[56] References Cited

U.S. PATENT DOCUMENTS

| | | |
|---|---|---|
| 4,738,819 | 4/1988 | Storch . |
| 4,858,994 | 8/1989 | Yamashita . |
| 5,261,726 | 11/1993 | Yanagishita . |
| 5,478,136 | 12/1995 | Takeuchi et al. . |
| 5,681,087 | 10/1997 | Yamano et al. . |
| 5,681,088 | 10/1997 | Takei . |
| 5,769,499 | 6/1998 | Dudash et al. . |
| 5,816,658 | 10/1998 | Wallis . |

FOREIGN PATENT DOCUMENTS

| | | |
|---|---|---|
| 62-257818 | 11/1987 | Japan . |
| 238008 | 2/1990 | Japan . |
| 2114986 | 4/1990 | Japan . |
| 440181 | 7/1992 | Japan . |
| 4125747 | 11/1992 | Japan . |
| 731724 | 7/1995 | Japan . |
| 8252147 | 10/1996 | Japan . |
| 9271425 | 10/1997 | Japan . |
| 2240920 | 8/1991 | United Kingdom . |

*Primary Examiner*—Milton Nelson, Jr.
*Attorney, Agent, or Firm*—Browdy and Neimark

[57] ABSTRACT

A generally annular or donut-like headrest for use on an automotive seat, which is formed by a donut-like trim cover assembly having an opening, a generally "U" shaped headrest frame and a sealing/connecting frame in an integral manner under a foaming process. The headrest frame is placed in the donut-like trim cover assembly, with two stay portions thereof projecting outwardly from the opening. The sealing/connecting frame has a groove and is connected between two stay portions of the headrest frame, such that the edge of that opening is fit engaged in the groove, which effectively prevents leakage of a liquid foaming base material through the opening during the foaming process. Further, a location element is provided on the two stay portions of headrest frame for limiting and locating the sealing/connecting frame at a predetermined point thereon with respect to the opening of trim cover assembly, which facilitates ease of a precise assembling and forming of the headrest under the foaming process.

14 Claims, 3 Drawing Sheets

FIG.1
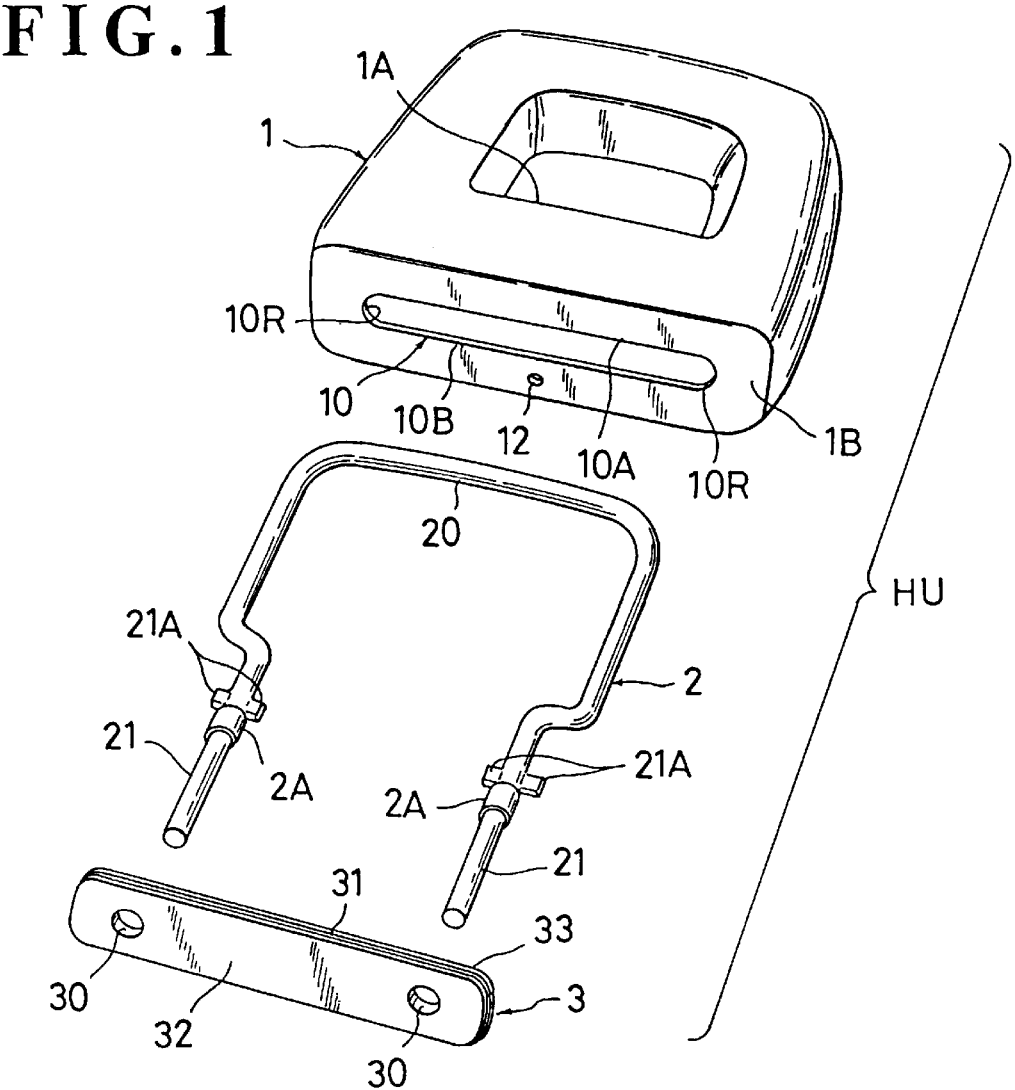
FIG.2
FIG.3
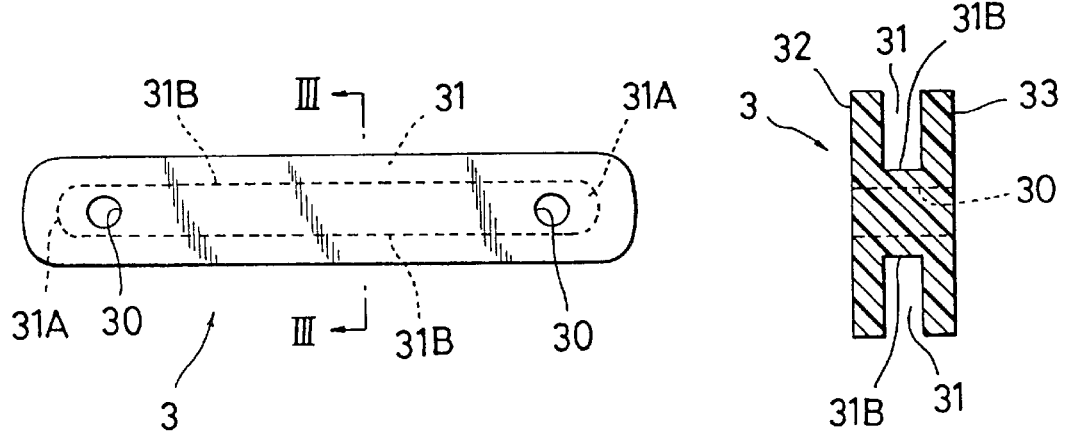

HEADREST FOR AUTOMOTIVE SEAT

BACKGROUND OF INVENTION

1. Field of the Invention

The present invention relates to a headrest for use on an automotive seat, of the type formed under a foaming process wherein a headrest frame is inserted into a three-dimensional trim cover assembly of a given headrest shape, through an opening defined therein, and then a liquid foaming base material is injected in the trim cover assembly, for foaming integrally the frame and trim cover assembly together. More particularly, the present invention is directed to a donut-like or generally annular headrest having a through-hole therein, which is formed by the foaming process of this kind.

2. Description of Prior Art

In a foaming process for forming a donut-like or annular headrest for use on an automotive seat, there is a step that requires using a generally annular shape of headrest frame with headrest stay(s) and inserting it into and along the annular hollow inside of a preformed three-dimensional donut-like trim cover assembly. Subsequent thereto, a liquid foaming base material is injected in that trim cover assembly and cured therein together with the headrest frame, so that a resulting foamed donut-like unit of headrest is obtained, with the headrest stay(s) projected therefrom.

This process, however, has encountered a technical difficulty in terms of how the annular headrest frame can be easily placed in the preformed donut-like trim cover assembly for the subsequent foaming process. Some solutions to this problem have been made as for example disclosed from the Japanese Laid-Open Patent Pub. Nos. 62-257818 and 9-271425, and also from the Japanese Granted Patent Pub. No. 4-401818. These prior art patents commonly suggest that a generally inverted-U-shaped headrest frame with headrest stays be inserted in the preformed donut-like trim cover assembly, and then, a connecting frame be connected between two side frame sections of such headrest frame, to thereby provide an annular frame portion extending in and along the donut-like trim cover assembly, after which, a foaming is effected to create a foam padding integrally with those frames and trim cover assembly, so that a resulting donut-like headrest is obtained.

But, such solution has been found defective in that the connecting frame can not be quickly and precisely assembled with the headrest frame, because a worker can hardly see the connecting point between the connecting and headrest frames which are both located in the trim cover assembly and must connect together those two frames within the trim cover assembly, by feeling them with his or her hands.

To overcome that drawback, it may be suggested that the connecting frame be connected with the headrest frame, outside of the trim cover assembly, as for example known from the Japanese Granted U.M. Pub. No. 7-31724. According to this prior art, a plate-like connecting frame is provided, which has a slit formed therein. During assembly, a generally U-shaped headrest frame is inserted into an opening of donut-like trim cover assembly and placed in the trim cover assembly through that opening, while projecting two headrest stay sections of the frame outwardly therefrom, and thereafter, the plate-like connecting frame is connected between the two projected headrest stay sections, while inserting the ends of the foregoing opening of the trim cover assembly into and through the slit of the connecting frame. In that way, the connecting frame can easily be accessed and connected to the headrest frame, externally of the trim cover assembly, in order to provide an annular framework in conformity with the donut-like trim cover assembly and also close the opening of the same trim cover assembly.

However, in this second prior art, the slit of connecting frame is formed rather narrow with a view to preventing leakage of a liquid foaming base material from between the slit and the ends of the opening, as a result of which, it is troublesome and time-consuming for a worker to squeeze and insert the ends of the opening into such narrow slit during assembly. Further, this sealing is rather rough, so that in the foaming process, a liquid foaming base material injected in the trim cover assembly will invade into non-tight spots between the connecting frame and ends of opening, and result in creating an objectionable uneven or irregular spots in the outer surface of resulting headrest after foaming process, which impairs the aesthetic appearance of headrest.

SUMMARY OF THE INVENTION

In view of the above-stated shortcomings, it is a primary purpose of the present invention to provide an improved donut-like headrest for use on an automotive seat, which can be easily and quickly formed under a foaming process, while preventing leakage of a liquid foaming base material therefrom.

In order to achieve such purpose, the headrest in accordance with the present invention, basically comprises:

a donut-like three-dimensional trim cover assembly having an annular inner hollow therein and an opening formed at one side thereof, wherein the opening includes an edge;

the donut-like three-dimensional trim cover assembly being of at least a two-layer lamination structure comprising a top cover layer and an elastic foam wadding layer;

a generally "U" shaped headrest frame means having a pair of stay portions for mounting on the automotive seat;

the generally "U" shaped headrest frame means being disposed in and along the annular inner hollow of donut-like three-dimensional trim cover assembly, with the pair of stay portions thereof projecting from the opening of trim cover assembly;

a sealing/connecting frame means for not only connection with the stay portions of said generally "U" shaped headrest frame means, but also closing and sealing of the opening, which sealing/connecting frame means has a groove in which the edge of opening is fit and engaged;

the sealing/connecting frame means being provided between the stay portions; and a foam padding which has been formed within the donut-like three-dimensional trim cover assembly under a foaming process such that a liquid foaming base material is injected and cured in the trim cover assembly together with a part of the generally "U" shaped headrest frame, excepting the stay portions, with the edge of opening being fit in the groove of sealing/connecting frame means, wherein the liquid foaming base material is prevented by the sealing/connecting frame means against leakage through the opening during the foaming process.

Accordingly, the edge of the opening of the trim cover assembly is simply fit engaged in the groove of sealing/connecting frame means, which provides a dual sealing effect wherein the opening edge is biasingly contacted with the bottom of that groove due to the elastic repercussive property of foam wadding layer of trim cover assembly, and further, the same opening edge is biased to contact with one wall of the groove by an increased mass of the foam cushion padding that has been formed under the foaming process. Thus, during the foaming process, such simplified dual sealing structure of sealing/connecting frame means assures to completely prevent leakage of the liquid foaming base material through the opening. Moreover, a worker can easily connect the sealing/connecting frame means to the stay portions of headrest frame from the outside, while simply fitting the edge of the opening of the trim cover assembly in the groove of the sealing/connecting frame means.

In one aspect of the present invention, a pair of holes may be formed in the sealing/connecting frame means, so that the foregoing pair of stay portions of headrest frame pass through these two holes, thereby easily connecting the sealing/connecting frame means with the headrest frame at a predetermined point, with a robust frame structure. Preferably, an elastic tubular sealing member may be provided on each of the two stay portions, so that the two holes of sealing/connecting frame means are secured about the respective tubular sealing member to seal any minute clearance therebetween against any possible leakage of a liquid base foaming material therethrough during the foaming process.

Other features and advantages of the present invention will become apparent from reading of the description hereinafter, with reference to the annexed drawings.

BRIEF DESCRIPTION OF THE DRAWINGS

FIG. 1 is an exploded schematic perspective view showing an incomplete headrest unit to be subjected to a foaming process in accordance with the present invention;

FIG. 2 is a front view of a sealing/connecting frame, one of principal parts of the present invention;

FIG. 3 is a sectional view taken along the line III—III in FIG. 2;

DETAILED DESCRIPTION OF PREFERRED EMBODIMENT OF THE INVENTION

Referring to FIGS. 1 through 9, there are illustrated one exemplified embodiment of headrest and its structure in accordance with the present invention, which is of the type having a generally donut-like or annular configuration for use on an automotive seat (not shown).

FIG. 1 shows an incomplete headrest unit, generally designated by (HU), which is provided before being subjected to a foaming process to be stated later. As illustrated in the exploded perspective, the unit (HU) basically comprises: a preformed donut-like or generally annular shape of trim cover assembly (1) having an elongated opening (10); a generally inverted-U-shaped headrest frame provided with a locating means (at 21A); and a plate-like sealing/connecting frame (3).

Figure 8:
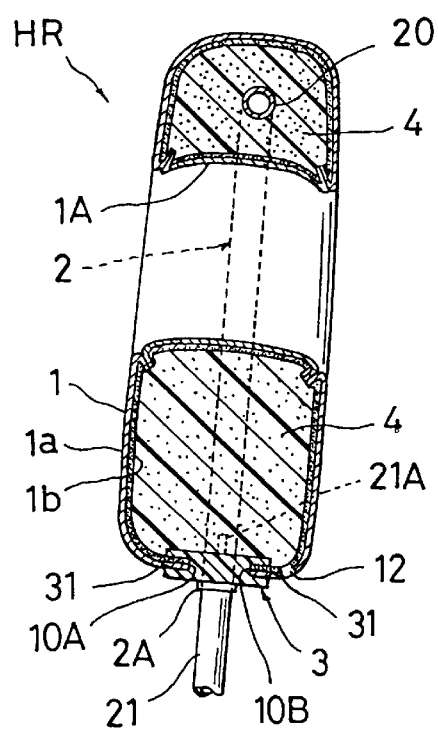
FIG. 8 is a schematic longitudinally sectional view of a resultant foamed headrest in accordance with one exemplary mode wherein the first mode of sealing/connecting frame is used.
Figure 9:
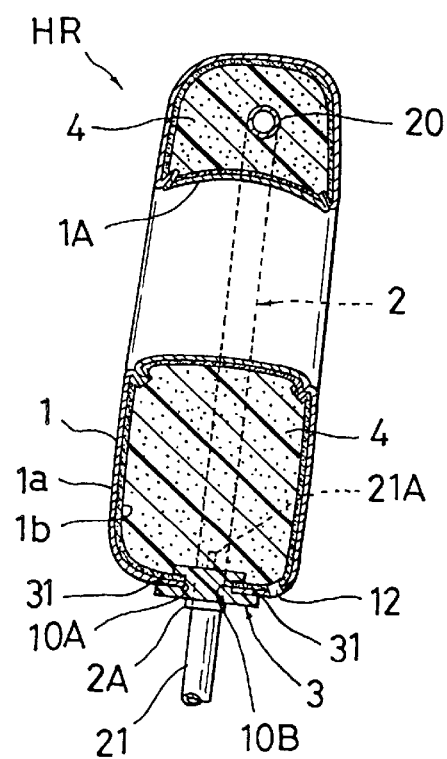
FIG. 9 is a schematic longitudinally sectional view of a resultant foamed headrest in accordance with another alternative exemplary mode wherein the another mode of sealing/connecting frame is used.

As can be seen from FIG. 1 in conjunction with FIGS. 7, 8 and 9, the trim cover assembly (1) itself may preferably be of at least a two-layer lamination structure comprising a top cover layer (1a) and a wadding layer (1b) of slab urethane foam material in this order, so as to have a certain elastic yet rigid property, an important factor for the elongated opening (10) as will be stated later. The top cover layer (1a) may be formed from a woven or non-woven fabric material or a synthetic resin leather material. The trim cover assembly (1) may be preformed by sewing together several separate cover sections of such two-layer lamination structure into the illustrated three-dimensional donut or annular shape having a through-hole (1A) defined centrally thereof. In particular, the bottom wall (1B) of this trim cover assembly (1) is formed with the foregoing elongated opening (10) and also with an injection hole (12). The injection hole (12) is adapted for allowing insertion of an injection nozzle (see 12 in FIG. 7) thereinto so that a liquid foaming base material may be injected via the nozzle into the trim cover assembly (1) at a subsequent foaming process to be explained. In the illustrated mode, the elongated opening (10) is so formed to have a pair of longitudinal edges (10A)(10B) and a pair of generally curved side edges (10R)(10R) such as to provide a proper degree of opening sufficient for the sealing/connecting frame (3) to be passed therethrough and smoothly placed in and along the annular inner hollow of trim cover assembly (1).

The sealing/connecting frame (3) is of an elongated plate-like configuration having a pair of spaced-apart holes (30)(30) formed therein and a peripheral engagement groove (31) formed in and along the periphery thereof. As will be apparent, the pair of holes (30) are so adapted that two stay portions (21)(21) of the headrest frame (2) may be passed therethrough, respectively. Strictly stated, the two holes (30) are both slightly greater in diameter than the respective two stay portions (21), since this allows smooth passing of the sealing/connecting frame (3) along the two stay portions (21) until the two holes (30) are frictionally retained about a tubular sealing member (2A), which will be elaborated later. As best shown in FIGS. 2 and 3, in the sealing/connecting frame (3), the peripheral engagement groove (31) represents a generally rectangular recession which conforms generally in shape to the likewise rectangular contour of foregoing edges (10A, 10B, 10R) of elongated opening (10). The groove (31) therefore has a pair of longitudinal bottoms (31B)(31B) for receipt of the respective two longitudinal edges (10A)(10B) of elongated opening (10), and a pair of generally curved side bottoms (31A)(31A) for receipt of the respective two side edges (10R)(10R) of the same opening (10). Designations (32)(33) respectively denote outward and inward walls (32)(33) of the frame (3) which are defined on the opposite sides of those bottoms (31A, 31B), as can be seen from FIG. 3. It is important in this context that the width of groove (31) be equal to or slightly greater than the total thickness of two-layer lamination (1a, 1b) of trim cover assembly (1), and that both longitudinal and side bottoms (31B)(31A) of that groove (31) be slightly greater in size than the opening degree of elongated opening (10) of trim cover assembly (1), for a sealing purpose at a subsequent foaming process to be explained. Preferably, the sealing/connecting frame (3) may be formed from a rigid and hard synthetic resin material, such as a polypropylen.

The headrest frame (2), in accordance with the present invention, is formed by bending a metallic tube or rod into a generally "U" shaped configuration having, defined therein, a generally semi-circular head support portion (20) and a pair of stay portions (21)(21) to be mounted on a seat back of automotive seat (not shown), as shown in FIG. 1, wherein each of the two stay portions (21) is provided with a pair of location projections (21A)(21A) as a means for limiting and locating the sealing/connecting frame (3) at a given position relative to the elongated opening (10) of trim cover assembly (1) in order that a worker may easily locate the frame (3) at the stay portions (21) of headrest frame (2) and also determine an appropriate proportion of the semi-circular head support portion (20) to be located within the annular inner hollow of donut-like trim cover assembly (1), while at the same time, the worker may directly engage the edges (10A, 10B, 10R) of opening (10) in and along the engagement groove (31) of frame (3), without taking into account the proportion of the stay portions (21) to the semi-circular head support portion (20) in relation to the trim cover assembly (1). For that purpose, both two pairs of location projections (21A), each extending integrally from the respective opposite sides of one of the stay portions (21), are disposed at a predetermined point on the stay portions (21) near to the juncture between the generally semi-circular head support portion (20) and stay sections (21).

Designations (2A)(2A) stand for a pair of tubular sealing members, each being secured about the respective pair of stay sections (21)(21) of headrest frame (2) and so adapted to fit, in tight engagement in the respective two holes (30) of sealing/connecting frame (3). The purpose of the sealing members (2A) is to not only retain the the sealing/connecting frame (3) at a predetermined position set by the afore-stated location projections (21A) upon both two stay sections (21) of headrest frame (2), but also seal a minute clearance between the stay section (21) and hole (30) against possible leakage of a liquid base foaming material therethrough. Those tubular sealing members (2A) may preferably be formed from a rubber tubular material or other suitable elastic material such as an elastic synthetic resin material, which strongly stick to and about the stay portion (21). As shown in FIG. 1, each of the sealing members (2A) is secured on the stay portion (21) at a point adjoining the location projections (21A), so that the sealing/connecting frame (3) may be secured by those sealing members at a predetermined point where the elongated hole (10) of trim cover assembly (1) may easily and quickly be fit engaged in and along the groove (31) of frame (3), as will be understood hereinafter.

Now, a description will be made of processes for forming a donut-like headrest, using the above-described basic constituent elements.

Figure 4:
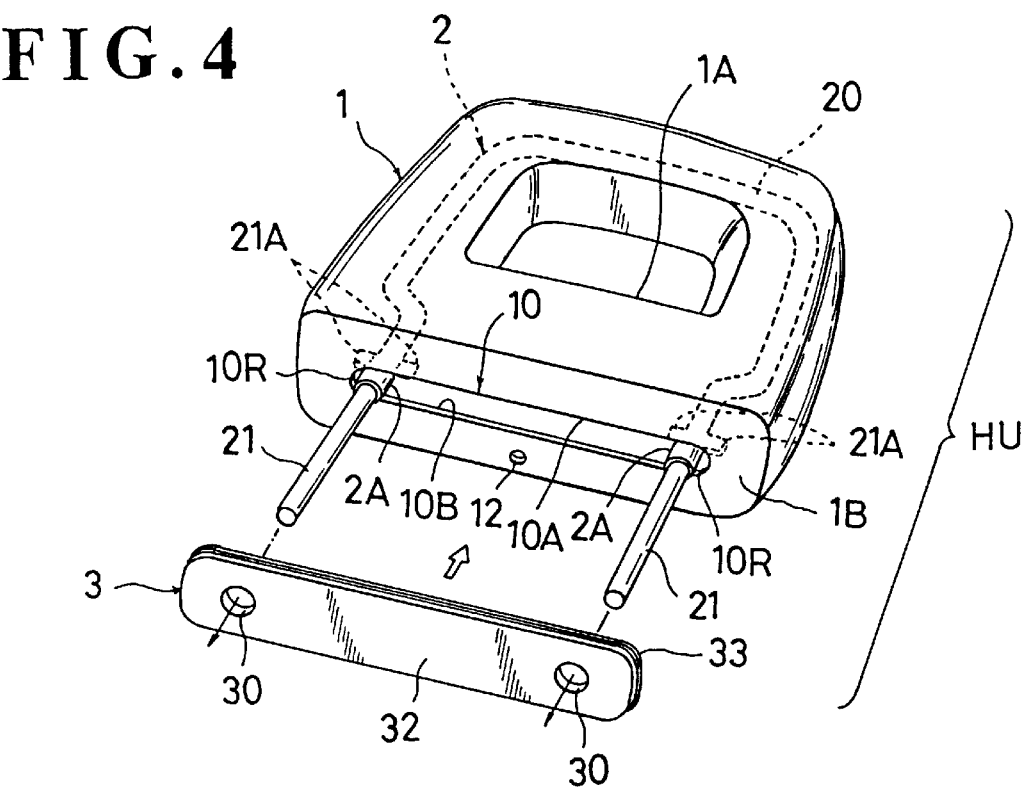
FIG. 4 is a diagram to explanatorily show one process of assembling the incomplete headrest unit, in which the sealing/connecting frame is about to be connected with two stay portions of headrest frame.
Figure 5:
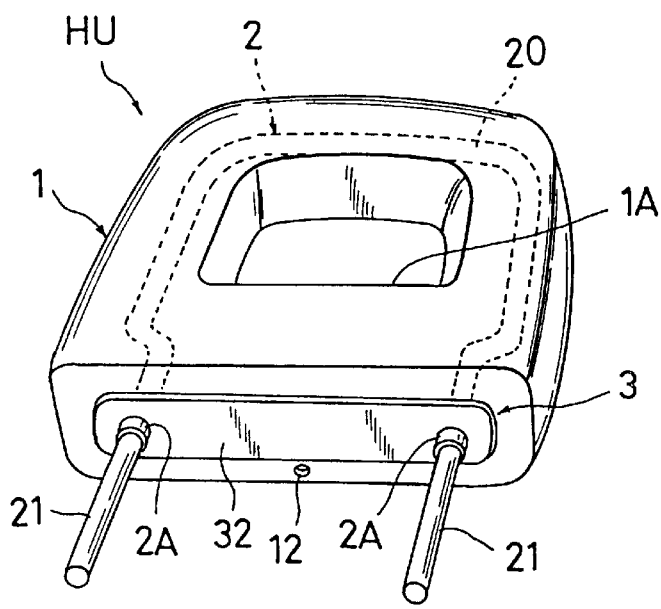
FIG. 5 is a perspective view of a resultant incomplete headrest unit.

At a first step, the headrest frame (2) is inserted via the elongated opening (10) into within the donut-like trim cover assembly (1) by first inserting on one of the two stay portions (21) of headrest frame (2) in and along the annular inner hollow of trim cover assembly (1) so that the headrest frame (2) is circulated within the trim cover assembly (1), and then, the whole of the headrest frame (2) is adjustingly placed in position within the trim cover assembly (2), with both two stay portions (21) projecting outwardly from the elongated opening (10), as can be seen in FIG. 4. At this point, a worker can easily find where to locate the headrest frame (2) and its two stay portions (21) relative to the opening (10), because he or she can see both location projections (21A) and tubular sealing members (2A) at that opening (10). Then, by letting the two stay portions (21) passed through the respective two holes (30), the worker should slide the sealing/connecting frame (3) on and along the two stay portions (21) of headrest frame (2) until both two holes (30) ride on and about the two sealing tubular members (2A), respectively. Further, the worker continue to forcibly slide the sealing/connecting frame (3) until the tubular sealing members (2A) are completely fit and secured in the respective holes (30) and the inward wall (33) of the frame (3) contacts the location projections (21A). In that way, the sealing/connecting frame (3) is now set in position between the generally semi-circular head support portion (20) and two stay portions (21) of headrest frame (2). Then, a worker widens the elongated opening (10) with respect to the sealing/connecting frame (3) and engages its edges (10A, 10B, 10R) in and along the peripheral engagement groove (31) of frame (3), whereupon an incomplete headrest unit (HU) is assembled as shown in FIG. 5.

Figure 7:
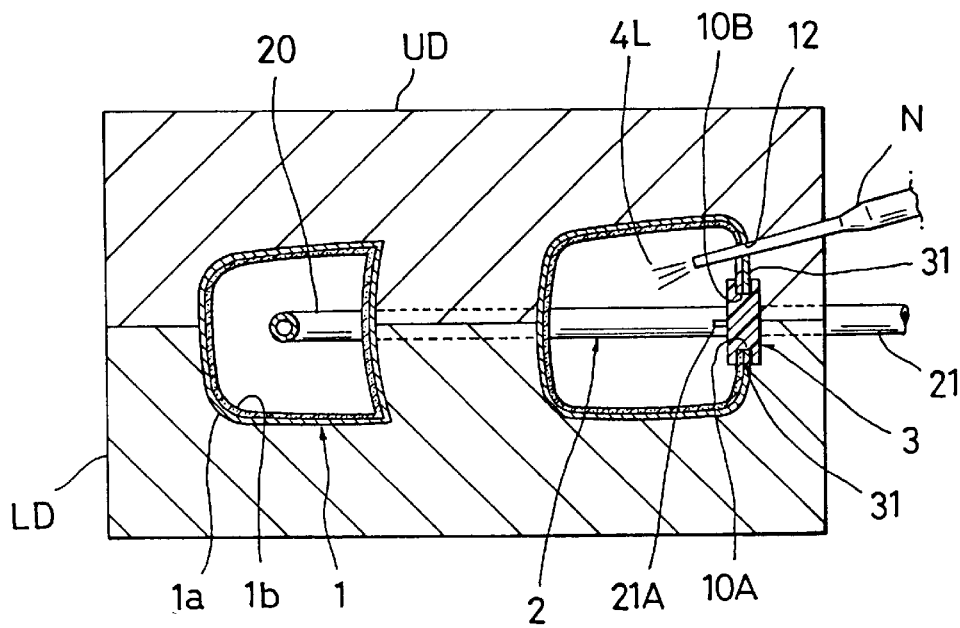
FIG. 7 is a schematic sectional view showing the state where the incomplete headrest unit is placed in a foaming die device, and also showing how a foaming is effected thereto.

Next, as understandable from FIG. 7, such incomplete headrest unit (HU) is placed between upper and lower dies (UD) (LD) of an ordinary known type of foaming die device, which in particular have die surfaces generally contoured along the outer shape of the above-assembled incomplete headrest unit (HU). Thereafter, an injection nozzle (N) is inserted into the inside of trim cover assembly (1) via the injection hole (12), and a liquid foaming base material (4L) is injected from the nozzle (N) thereinto, so that an appropriate amount of the base material (4L) is contained in the trim cover assembly (1). The liquid foaming base material (4L) is then cured to subject the whole incomplete headrest unit (HU) to foaming, whereby a foam padding (4) is formed and filled within the trim cover assembly (1) integrally together with the headrest frame (2) and sealing/connecting frame (3), as observed FIGS. 8 and 9, thereby producing a resultant donut-like headrest (HR). During this foaming process, it is appreciated that the whole edges (10A, 10B, 10R) of elongated opening (10), due to its elastic repercussive property originated from the foam wadding layer (1b) of the associated trim cover assembly (1), are biasingly abutted tight against and along the groove bottoms (31A, 31B) of the sealing/connecting frame (3), and in addition, the increasing elastic mass of foamed base material (4L) pressingly causes the peripheral area of opening (10) to closely contact the outward wall side (32) of groove (31) of sealing/connecting frame (3), whereby a dual sealing effect is provided between the frame (3) and opening (10) to completely prevent leakage of the liquid foaming base material (4L) therethrough.

Figure 6:
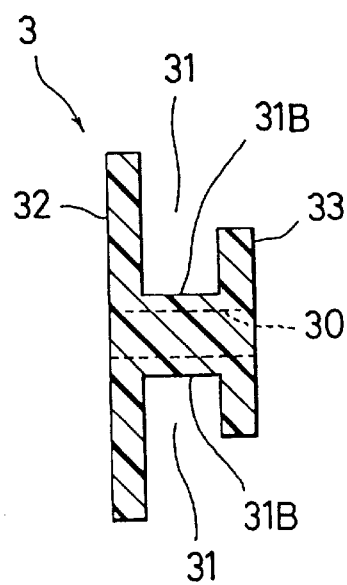
FIG. 6 is a sectional view of another alternative mode of the sealing/connecting frame.

FIG. 6 shows an alternative mode of the sealing/connecting frame (3), by way of example, that can be contemplated within the scope of the present invention, according to which, a small inward wall (33) is formed relative to the outward wall (32) by simply cutting off the peripheral end region of the corresponding inward wall of the above-described first mode of frame (3). This arrangement facilitates the ease with which a worker can engage the opening edges (10A, 10B, 10R) of trim cover assembly (1) in and along the engagement groove (31) of sealing/connecting frame (3). For, he or she does not need to widen the opening (10) as much as in the first mode having the same sizes of outward and inward walls (33)(32). Subsequent thereto, in the present alternative mode, the same foaming process is effected, as previously stated, using the same foaming die device shown in FIG. 7. FIG. 9 shows a resultant donut-like headrest (HR) in which such second mode of sealing/connecting frame (3) is used. In this case also, the same dual sealing effect is realized between the frame (3) and opening (10), thereby preventing leakage of the liquid foaming base material (4L) therethrough.

Accordingly. in accordance with the present invention, both two frames (2) and (3) can be quickly assembled together at a given connecting point (at 21A), without any care about proportion between the generally circular head support portion (20) and two stay portions (21) in relation to the trim cover assembly (1), and the sealing/connecting frame (3) can be easily attached about the opening (10) to close the latter in an optimum sealing fashion effective at the subsequent foaming process. Further, the sealing/connecting frame (3) is connected with the headrest frame (2) via the two holes (30), which advantageously allows a worker to assure positive connection between the two frames (3)(2) with much ease and rapidity, and also provides a reinforcement to the headrest frame (2). Moreover, in contrast to the hitherto headrest framework of this sort, the connecting frame (3) per se has the outward wall (32) to be exposed externally of the trim cover assembly (1), and therefore, that wall (32) serves to finally stop invasion of liquid foaming base material (4L) and cover the peripheral region of the opening (10) in which such invasion might occur, hence concealing any uneven spots of invaded cured foaming material that have been created after the foaming process.

While having described the present invention thus far, it should be understood that the invention is not limited to the illustrated embodiments, but any other modifications, replacements and additions may be applied thereto structurally without departing from the scopes of the appended claims.

What is claimed is:

1. A headrest of a generally annular or donut-like type for use on an automotive seat, comprising:

an annular three-dimensional trim cover assembly having an annular inner hollow therein and an opening formed at one side thereof, wherein said opening includes an edge;

said annular three-dimensional trim cover assembly being of at least a two-layer lamination structure comprising a top cover layer and an elastic foam wadding layer;

a generally "U" shaped headrest frame means having a pair of stay portions for mounting on said automotive seat;

said generally "U" shaped headrest frame means being disposed in and along the annular inner hollow of said annular three-dimensional trim cover assembly, with the pair of stay portions thereof projecting from said opening of the trim cover assembly;

a sealing/connecting frame means for not only connection with said pair of stay portions of said generally "U" shaped headrest frame means, but also closing and sealing of said opening, said sealing/connecting frame means having a groove in which the edge of said opening fits and is engaged;

said sealing/connecting frame means being provided between said pair of stay portions; and a foam padding which has been formed within said annular three-dimensional trim cover assembly under a foaming process such that a liquid foaming base material is injected and cured in the trim cover assembly together with a part of said generally "U" shaped headrest frame excluding said pair of stay portions, with the edge of said opening being fit in said groove of the sealing/connecting frame means, wherein the liquid foaming base material is prevented by said sealing/connecting frame means against leakage through said opening during the foaming process.

2. The headrest as defined in claim 1, wherein said generally "U" shaped headrest frame is formed by bending a metallic tubular or rod material in a generally "U" shape such as to define therein a generally semi-circular head support portion and said pair of stay portions, and wherein said generally semi-circular head support portion is disposed within the annular inner hollow of said annular trim cover assembly, with said pair of stay portions projecting through said opening and sealing/connecting frame means to the outside of the headrest.

3. The headrest as defined in claim 1, which further comprises a locating means for limiting and locating said sealing/connecting frame means at a predetermined point on said pair of stay portions with respect to said opening of the annular three-dimensional trim cover assembly, and an elastic tubular sealing member which is provided on each of said pair of stay portions adjacent to said predetermined point such as to seal a clearance between said pair of holes of said sealing/connecting frame means and said pair of stay portions.

4. The headrest as defined in claim 1, which further comprises a locating means for limiting and locating said sealing/connecting frame means at a predetermined point on said pair of stay portions with respect to said opening of the annular three-dimensional trim cover assembly.

5. The headrest according to claim 4, wherein said locating means comprises at least one locating projection formed integrally on each of said pair of stay portions.

6. The headrest as defined in claim 1, wherein said sealing/connecting frame means includes a pair of holes formed therein, and wherein said sealing/connecting frame means is connected between said pair of stay portions of said headrest frame, such that said pair of stay portions pass through said pair of holes, respectively.

7. The headrest according to claim 6, wherein an elastic tubular sealing member is provided on each of said pair of stay portions such as to seal a clearance between said pair of holes of said sealing/connecting frame means and said pair of stay portions.

8. The headrest as defined in claim 1, wherein said sealing/connecting frame means comprises a thin plate sealing/connecting frame, wherein said groove is formed in and along a peripheral end of said thin plate sealing/connecting frame, and wherein said edge of said opening associated with said annular three-dimensional trim cover assembly fits and engages in along said groove, such that said edge of the opening is biasingly engaged in the groove due to an elastic repercussive property of said foam wadding layer of the trim cover assembly.

9. The headrest according to claim 8, wherein said a thin plate sealing/connecting frame is formed from a hard synthetic resin material.

10. The headrest according to claim 8, wherein said groove has a bottom slightly great in size relative to said opening so that said edge of the opening is biased to a close contact with said bottom of the groove due to said elastic repercussive property associated with the trim cover assembly.

11. The headrest according to claim 8, wherein said groove has a width equal to a thickness of said trim cover assembly.

12. The headrest according to claim 8, wherein said groove has a width slightly greater than a thickness of said trim cover assembly.

13. The headrest according to claim 8, wherein said thin sealing/connecting frame has outward and inward walls defined therein relative to said groove, and wherein said outward and inward walls respectively face in outward and inward directions of said trim cover assembly.

14. The headrest according to claim 13, wherein said inward wall is formed small relative to said outward wall.

* * * * *